(12) United States Patent
Hole et al.

(10) Patent No.: US 8,811,296 B2
(45) Date of Patent: Aug. 19, 2014

(54) SYSTEM AND METHOD FOR ONE-PHASE ACCESS IN A COMMUNICATION SYSTEM

(75) Inventors: David Hole, Southampton (GB); Guillaume Sebire, Helsinki (FI); David Navratil, Helsinki (FI)

(73) Assignee: Nokia Solutions and Networks Oy, Espoo (FI)

( * ) Notice: Subject to any disclaimer, the term of this patent is extended or adjusted under 35 U.S.C. 154(b) by 546 days.

(21) Appl. No.: 12/263,056

(22) Filed: Oct. 31, 2008

(65) Prior Publication Data

US 2009/0168709 A1 Jul. 2, 2009

Related U.S. Application Data

(60) Provisional application No. 60/985,893, filed on Nov. 6, 2007.

(51) Int. Cl.
*H04L 5/14* (2006.01)

(52) U.S. Cl.
USPC .......................... 370/329; 455/509; 455/510

(58) Field of Classification Search
USPC .......... 370/235, 328; 455/63.1, 329, 509, 510
See application file for complete search history.

(56) References Cited

U.S. PATENT DOCUMENTS

| | | | |
|---|---|---|---|
| 6,870,858 B1 | 3/2005 | Sebire | |
| 7,058,132 B1 | 6/2006 | Sebire et al. | |
| 2003/0076812 A1* | 4/2003 | Benedittis | 370/350 |
| 2005/0243744 A1* | 11/2005 | Tan | 370/278 |
| 2006/0072520 A1* | 4/2006 | Chitrapu et al. | 370/337 |
| 2008/0019310 A1* | 1/2008 | Sebire et al. | 370/329 |
| 2008/0225802 A1* | 9/2008 | Sun et al. | 370/336 |
| 2010/0080125 A1* | 4/2010 | Olsson et al. | 370/235 |
| 2013/0107865 A1* | 5/2013 | Diachina et al. | 370/331 |

FOREIGN PATENT DOCUMENTS

WO WO 2007/051578 A1 5/2007

OTHER PUBLICATIONS

Nokia Siemens Network, et al., "Introduction of EGPRS-2 capabilities," 3GPP TSG GERAN WG1 ad hoc on Huge and Red Dot, AHG1-070049, Sophia Antipolis, France, Jun. 19-21, 2007, 12 pages.
Siemens, "Revision of Chapter 7 of TR 45.912," 3GPP TSG-GERAN Meeting #30, GP-061106, Lisbon, Portugal, Jun. 26-30, 2006, 52 pages.
Nokia Siemens Networks, "Clean-up on texting related to GERAN Evolution Features," 3GPP TSG GERAN Meeting #36, Vancouver, Canada, Nov. 12-16, 2007, GP-071623 and 3GPP TSG-GERAN WG2 Meeting #35bis, Sophia Antipolis, France, Oct. 8-10, 2007, G2-070324, 12 pages.
"3rd Generation Partnership Project; Technical Specification Group GSM/EDGE Radio Access Network; Multiplexing and multiple access on the radio path (Release 7)", 3GPP TS 45.002, V7.5.0, Aug. 2007, 106 pages.

(Continued)

*Primary Examiner* — Awet Haile
(74) *Attorney, Agent, or Firm* — Squire Patton Boggs (US) LLP

(57) ABSTRACT

An apparatus in accordance with a system and method for one-phase access in a communication system. In one embodiment, the apparatus includes a processor configured to create a packet channel request message enabling one-phase access including an indication of a latency reduction capability thereof. The apparatus also includes a transceiver configured to transmit the packet channel request message.

14 Claims, 11 Drawing Sheets

(56) References Cited

OTHER PUBLICATIONS

"3rd Generation Partnership Project; Technical Specification Group GSM/EDGE Radio Access Network; General Packet Radio Service (GPRS); Mobile Station (MS)—Base Station System (BSS) interface; Radio Link Control/Medium Access Control (RLC/MAC protocol (Release 7)", 3GPP TS 44.060, V7.10.0, Sep. 2007, 536 pages.

"3rd Generation Partnership Project; Technical Specification Group GSM/EDGE Radio Access Network; General Packet Radio Service (GPRS); Overall description of the GPRS radio interface; Stage 2 (Release 7)", 3GPP TS 43.064, V7.6.0, Aug. 2007, 90 pages.

"3rd Generation Partnership Project; Technical Specification Group Core Network and Terminals; Mobile radio interface Layer 3 specification; Core network protocols; Stage 3 (Release 7)", 3GPP TS 24.055, V7.9.0, Sep. 2007, 549 pages.

"3rd Generation Partnership Project; Technical Specification Group Services and System Aspects; General Packet Radio Service (GPRS); Service description; Stage 2 (Release 7)", 3GPP TS 23.060, V7.5.0, Sep. 2007, 216 pages.

"3rd Generation Partnership Project; Technical Specification Group Core Network and Terminals; Mobile radio interface Layer 3 specification; Core network protocols; Stage 3 (Release 6)," 3GPP TS 24.008, V6.18.0, Mar. 2008; pp. 1-527.

"3rd Generation Partnership Project; Technical Specification Group GSM/EDGE Radio Access Network; Channel coding (Release 7)," 3GPP TS 45.003 V7.4.0, Feb. 2008; pp. 1-317.

* cited by examiner

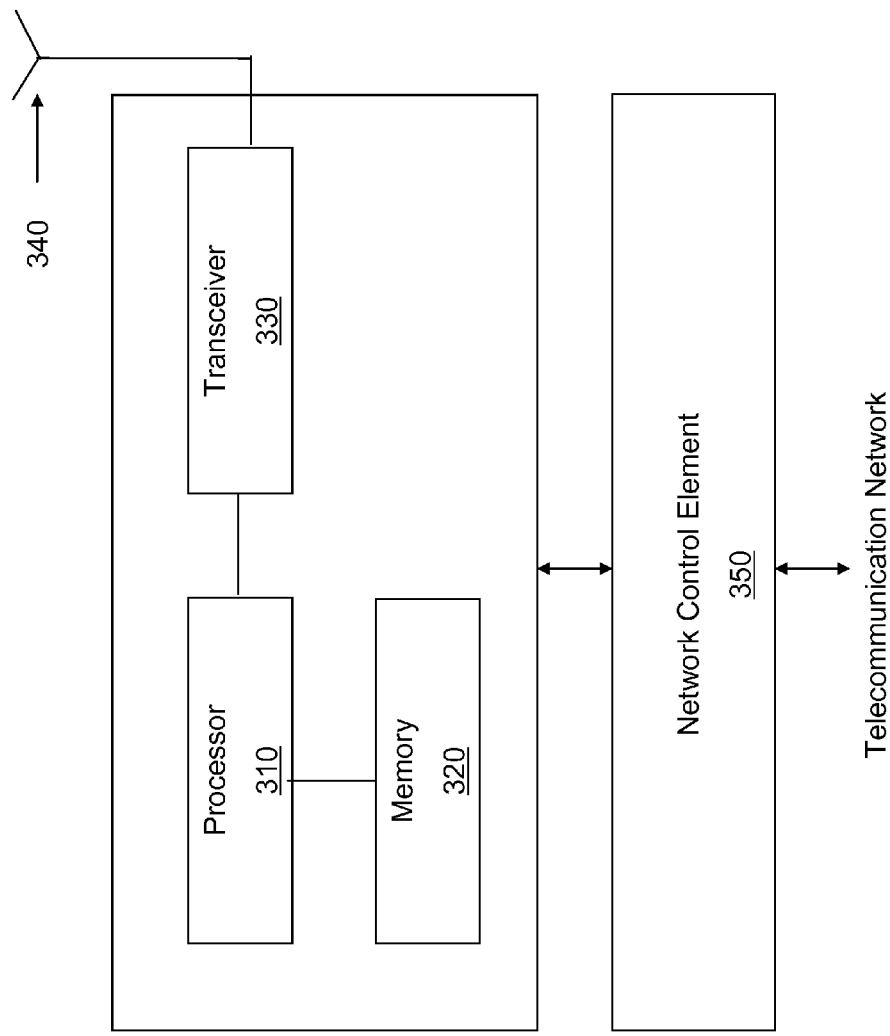

| Bit | | | | | | | | Octet |
|---|---|---|---|---|---|---|---|---|
| 8 | 7 | 6 | 5 | 4 | 3 | 2 | 1 | |
| TFI | | | Countdown Value | | | SI | R | 1 |
| CPS | BSN1 | | | | | TFI | | 2 |
| | | | BSN1 | | | | | 3 |
| E2S | PI | RS B | SPB | | | CPS | | 4 |

FIGURE 7

| PANI / E2S | RSB | Meaning |
|---|---|---|
| x | 0 | EGPRS2 not supported |
| x | 1 | EGPRS2 supported |
| 0 | 1 | EGPRS2-A only supported |
| 1 | 1 | EGPRS2-B and EGPRS2-A supported |

FIGURE 8

SYSTEM AND METHOD FOR ONE-PHASE ACCESS IN A COMMUNICATION SYSTEM

This application claims the benefit of U.S. Provisional Application No. 60/985,893 entitled "System and Method for One-Phase Access for GERAN Evolution in a Communication System," filed on Nov. 6, 2007, which is incorporated herein by reference.

TECHNICAL FIELD

The present invention is directed, in general, to communication systems and, more particularly, to a system and method for one-phase access in a wireless communication system.

BACKGROUND

Modern wireless communications systems are evolving to provide high speed packet data services for users of mobile stations. One example is an ability to provide Internet access to a user of the mobile station. A wireless communication system that is rapidly evolving in this direction is a time division multiple access ("TDMA") system known as the global system for mobile communications ("GSM"), in particular enhanced versions of GSM known as GSM+, general packet radio services ("GPRS"), enhanced general packet radio services ("EGPRS") and GSM EDGE radio access network ("GERAN") evolution. In EGPRS, the same access types as in GPRS are supported to establish a so-called temporary block flow ("TBF") in the uplink direction (i.e., from the mobile station to a base station). To accomplish this, a control message used by a GPRS mobile station to request a packet channel (e.g., an 11 bit packet channel request message) is re-used for EGPRS.

A new message, the 11-bit EGPRS packet channel request message, was also introduced for EGPRS to allow the EGPRS mobile station to indicate its uplink capability for EGPRS and 8-symbol phase-shifted keying ("8-PSK") modulation at random access by two alternative training sequences, namely, TS1 and TS2. The identification by the base station of the reception of either training sequence TS1, TS2 indicates that the mobile station supports EGPRS, while the identification of the exact training sequence, TS1, TS2, indicates whether the EGPRS mobile station supports 8-PSK modulation in the uplink. The content of the message indicates what type of access the mobile station employs.

The EGPRS packet channel request message indicates what type of access the mobile station employs. The different access types that can be used when establishing an EGPRS connection include a one-phase access request ("OPAR"), a short access request ("SAR") and a two-phase access request ("TPAR"). The one-phase access request is the fastest and most effective way of temporary block flow establishment. The short access request is employed when a small number of radio link control ("RLC") blocks (<=8) need to be transmitted. The two-phase access request requires more signaling than OPAR and SAR before the TBF is actually set up.

With the introduction of EGPRS2 ("EGPRS Phase 2") and latency reduction features (herein referred to as "LATRED"), it is not possible to indicate at one-phase access the support of latency reduction features and/or EGPRS2 in the uplink. In order not to force two-phase access at the temporary block flow establishment so as to enable the use of these features in the uplink, what is needed in the art is a system and method that provides an indication of support of features such as LATRED, EGPRS2 in uplink, both LATRED and EGPRS2 in uplink employing one-phase access that overcomes deficiencies in the prior art.

SUMMARY OF THE INVENTION

These and other problems are generally solved or circumvented, and technical advantages are generally achieved, by advantageous embodiments of the present invention, which includes an apparatus in accordance with a system and method for one-phase access in a communication system. In one embodiment, the apparatus (e.g., user equipment or a part thereof) includes a processor configured to create a packet channel request message enabling one-phase access including an indication of a latency reduction capability thereof. The apparatus also includes a transceiver configured to transmit the packet channel request message.

In another aspect, the present invention provides an apparatus (e.g., a base station or a part thereof) including a transceiver configured to receive a packet channel request message enabling one-phase access including an indication of a latency reduction capability of user equipment. The apparatus also includes a processor configured to provide a wireless channel to the user equipment to transmit an information message in response to the packet channel request message.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIGS. 1, 2A, 2B and 3 illustrate system level diagrams of embodiments of communication systems including a wireless communication system that provides an environment for the application of the principles of the present invention;

FIGS. 4, 5, 6, and 7 illustrate, respectively, diagrams of embodiments of an RLC/MAC header type 2 (modulation and coding scheme ("MCS")-5 and MCS-6) with reduced latency, an RLC/MAC header type 3 (MCS-1 to MCS-4) with reduced latency, an RLC/MAC header type 2 (MCS-5 and MCS-6) without reduced latency, and an RLC/MAC header type 3 (MCS-1 to MCS-4) without reduced latency, each constructed according to the principles of the present invention;

FIG. 8 illustrates a table of an embodiment of piggybacked ack/nack indicator ("PANI")/EGPRS2 support indicator ("E2S") and resent block bit ("RSB") bit assignments during contention resolution;

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention is directed a system and method for one-phase access in a third generation partnership program ("3GPP") GERAN ("GSM EDGE radio access network") evolution wireless communication system. The invention is related further to global system for mobile communications ("GSM"), enhanced data rates for GSM evolution ("EDGE"), radio link control/medium access control ("RLC/MAC") layers, and in certain cases, ready to receive messages, which provide acknowledgment of the reception of a message frame. In an exemplary embodiment, the system as provided herein is compatible with 3GPP TS 44.060, which is incorporated herein by reference.

The system and method should be capable of informing a communication system at call setup with one-phase access of a number of additional mobile station ("MS") capabilities specific to that mobile station. Without one-phase access, the communication system would obtain the information for call setup with some delay (i.e., necessitating the use of two-phase access), and with additional mobile station-specific capabilities often not exploited. There are no alternative solutions in the present signaling structure to quickly convey information about additional mobile station capabilities. The only present alternative is two-phase-access, with the drawback that mobile station capabilities in some cases cannot be utilized without additional delay.

Figure 1:
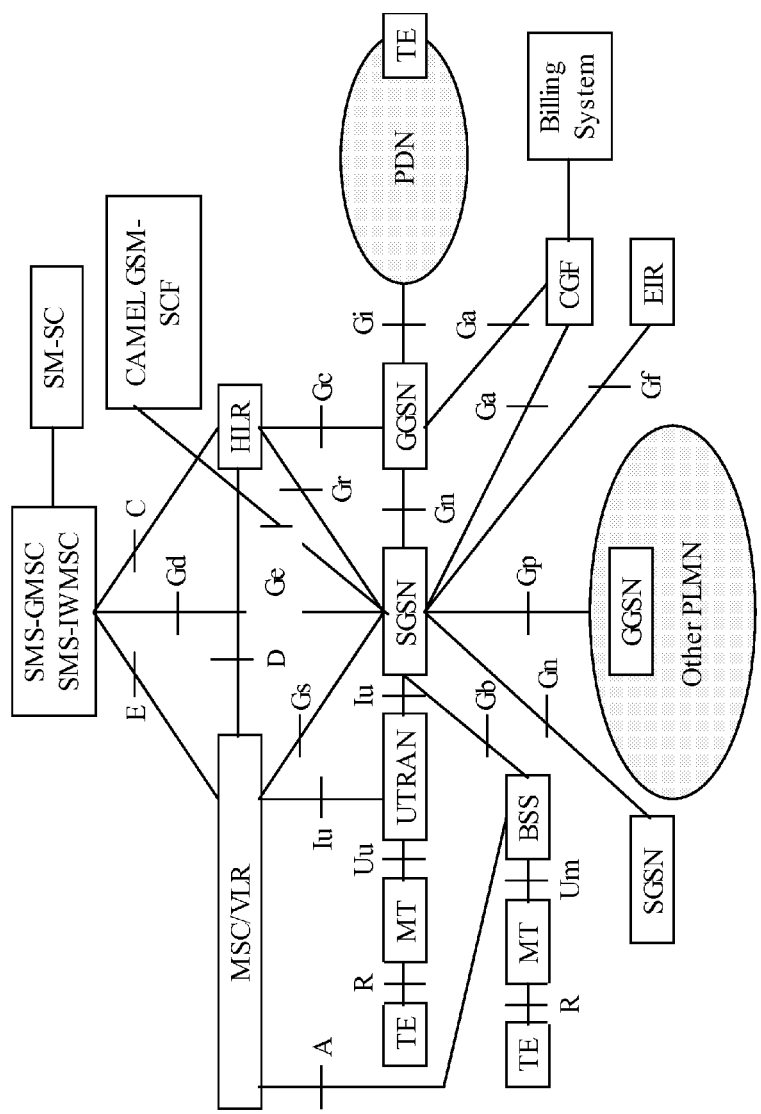

Referring initially to FIG. 1, illustrated is a system level diagram of a communication system including a wireless communication system that provides an environment for the application of the principles of the present invention. The communication system in the illustrated embodiment provides an overview of the GPRS logical architecture. For a more detailed understanding of a GPRS network, see 3GPP TS 23.060, which is incorporated herein by reference. The GPRS core network functionality is logically implemented on two network nodes, a serving GPRS support node ("SGSN") and a gateway GPRS support node ("GGSN").

A GPRS support node ("GSN") contains functionality to support GPRS functionality for GERAN and/or universal mobile telecommunications system terrestrial radio access network ("UTRAN"). In one public land mobile network ("PLMN"), there may be more than one GSN. The GGSN is the node that is accessed by the packet data network ("PDN") due to evaluation of the packet data protocol ("PDP") address. It contains routing information for packet switched ("PS")-attached users. The routing information is used to tunnel network protocol data units ("N-PDUs") to a mobile station's (designated "TE," also referred to as "MS") current point of attachment (i.e., the SGSN). The GGSN may request location information from the home location register ("HLR") via an optional Gc interface. The GGSN is the first point of PDN interconnection with a PLMN supporting GPRS (i.e., a Gi reference point is supported by the GGSN). The GGSN functionality is common for all types of radio access networks ("RANs").

The SGSN is the node that is serving the mobile station. The SGSN supports GPRS for A/Gb mode (i.e., a Gb interface is supported by the SGSN) and/or Iu-mode (i.e., an Iu interface is supported by the SGSN). At PS attach, the SGSN establishes a mobility management context containing information pertaining to, for instance, mobility and security for the mobile station. At PDP context activation, the SGSN establishes a PDP context, to be used for routing purposes, with the GGSN that the subscriber will be using.

The SGSN and GGSN functionalities may be combined in the same physical node, or they may reside in different physical nodes. The SGSN and the GGSN contain Internet protocol ("IP") or other (operator's selection, e.g., asynchronous transfer mode service ("ATM-SVC")) routing functionality, and they may be interconnected with IP routers. In an Iu mode, the SGSN and RNC may be interconnected with one or more IP routers. When the SGSN and the GGSN are in different PLMNs, they are interconnected via the Gp interface. The Gp interface provides the functionality of the Gn interface, plus security functionality for inter-PLMN communication. The security functionality is based on mutual agreements between operators.

The SGSN may send location information to the mobile switching center/visitor location register ("MSC/VLR") via the optional Gs interface. The SGSN may receive paging requests from the MSC/VLR via the Gs interface. The SGSN interfaces with the GSM-service control function ("GSM-SCF") for optional customized application for the mobile network enhanced logic ("CAMEL") control using Ge reference point. Depending on the result from the CAMEL interaction, the session and packet data transfer may proceed normally.

The HLR contains GPRS subscription data and routing information. The HLR is accessible from the SGSN via the Gr interface and from the GGSN via the Gc interface. For roaming mobile stations, the HLR may be in a different PLMN than the current SGSN. The short message service gateway MSC ("SMS-GMSC") and short message service interworking MSC ("SMS-IWMSC") are connected to the SGSN via the Gd interface to enable the SGSN to support SMS.

Figure 2A:
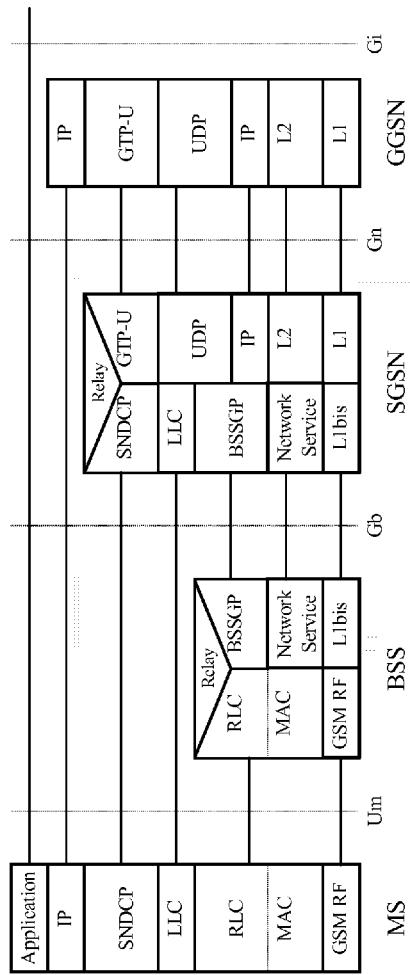
Figure 2B:
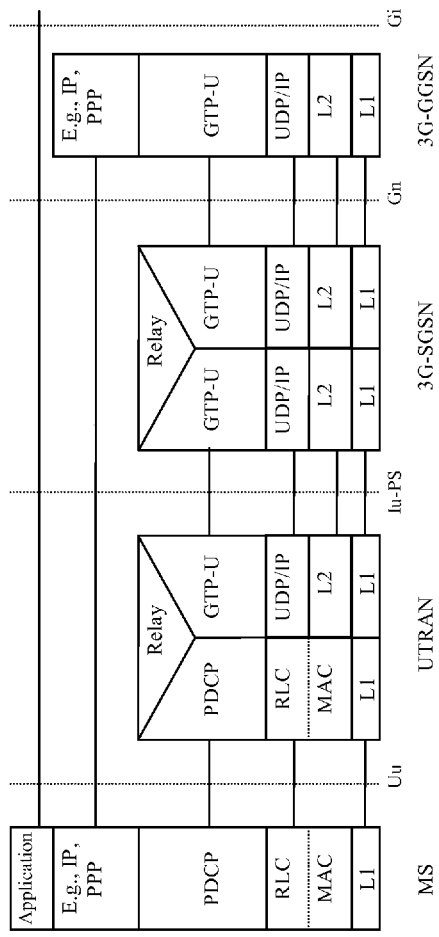
Figure 4:
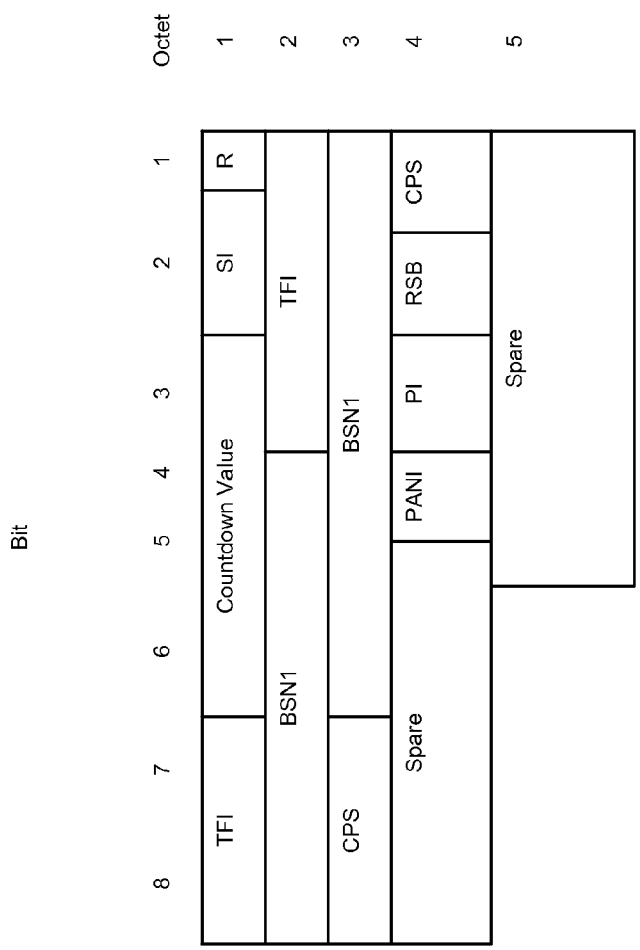
Figure 5:
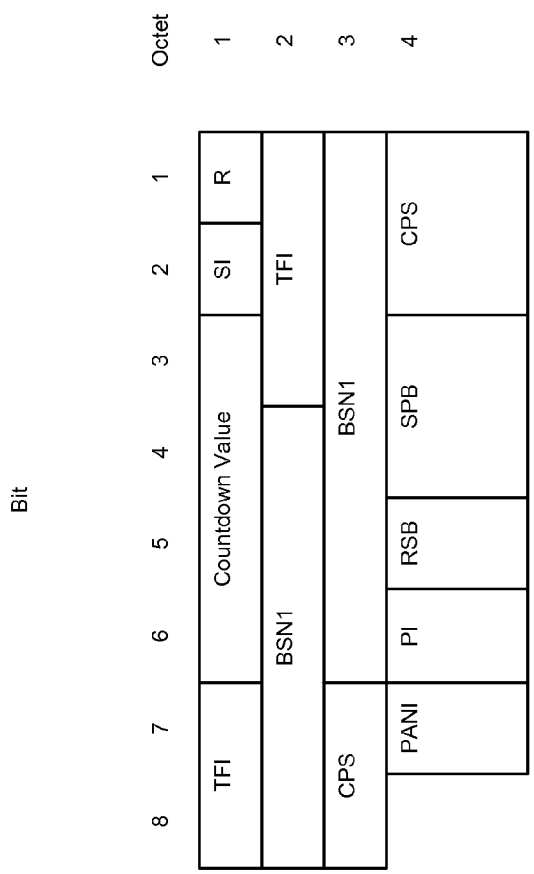
Figure 6:
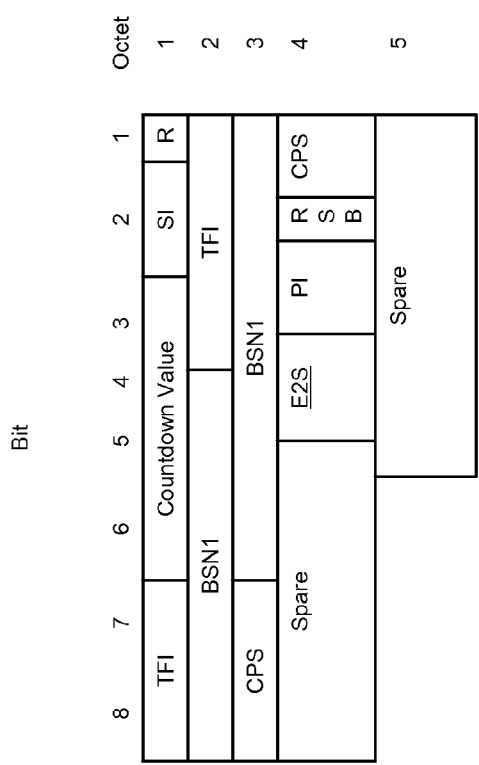

Turning now to FIGS. 2A and 2B, illustrated are system level diagrams of user planes for A/Gb mode and/or Iu-mode, respectively, for a GPRS network that provides an environment for the application of the principles of the present invention. The user plane includes a layered protocol structure providing user information transfer, along with associated information transfer control procedures (e.g., flow control, error detection, error correction and error recovery). The user plane independence of the network subsystem ("NSS") platform from the underlying radio interface is preserved via the Gb interface.

The following information relates to the user plane used in the A/Gb mode. A GPRS tunneling protocol for the user plane ("GTP-U") tunnels user data between GPRS support nodes in the backbone network. The GPRS tunneling protocol encapsulates PDP PDUs. A user data protocol ("UDP") carries GTP PDUs for protocols that do not need a reliable data link (e.g., IP), and provides protection against corrupted GTP PDUs. The IP is the backbone network protocol used for routing user data and control signaling. A subnetwork dependent convergence protocol ("SNDCP") is a transmission functionality that maps network-level characteristics onto the characteristics of the underlying network.

A logical link control ("LLC") is a layer that provides a highly reliable ciphered logical link. The LLC is independent of the underlying radio interface protocols to allow an introduction of alternative GPRS radio solutions with minimum changes to the NSS. A relay in the base station system ("BSS") relays LLC PDUs between the Um and Gb interfaces. In the SGSN, this function relays PDP PDUs between the Gb and Gn interfaces. A base station system GPRS protocol ("BSSGP") conveys routing and quality of service ("QoS")-related information between the BSS and the SGSN. A network service ("NS") layer transports BSSGP PDUs. A radio link control/media access control ("RLC/MAC") layer contains two functions. The radio link control function provides a radio-solution-dependent reliable link. The medium access control function controls the access signaling (request and grant) procedures for the radio channel, and the mapping of LLC frames onto the GSM physical channel.

The following information relates to user plane used in the Iu-mode mode. A packet data convergence protocol ("PDCP") is a transmission functionality that maps higher-level characteristics onto the characteristics of the underlying radio-interface protocols. The PDCP provides protocol transparency for higher-layer protocols. The PDCP supports IPv4, point-to-point protocol ("PPP") and IPv6. Unlike in A/Gb mode, user data compression is not supported in Iu mode, because the data compression efficiency depends on the type of user data, and because many applications compress data before transmission. It is difficult to check the type of data in the PDCP layer, and compressing all user data requires too much processing.

A GPRS tunneling protocol for the user plane ("GTP-U") tunnels user data between UTRAN and the 3G-SGSN, and between the GSNs in the backbone network. The GTP encapsulates PDP PDUs. The SGSN controls the user plane tunnel establishment and may establish a direct tunnel between UTRAN and GGSN. A user data protocol/Internet protocol ("UDP/IP") are the backbone network protocols used for routing user data and control signaling. A radio link control ("RLC") is an RLC protocol that provides logical link control over the radio interface. There may be several simultaneous RLC links per mobile station, wherein each link is identified by a bearer Id. A medium access control ("MAC") is a MAC protocol that controls the access signaling (request and grant) procedures for the radio channel.

Turning now to FIG. 3, illustrated is a system level diagram of a communication element of a communication system that provides an environment and structure for application of the principles of the present invention. The communication element may represent, without limitation, an apparatus including a base station, user equipment, such as a terminal or mobile station, a network control element, or the like. The communication element includes, at least, a processor 310, memory 320 that stores programs and data of a temporary or more permanent nature, an antenna 330, and a radio frequency transceiver 340 coupled to the antenna 330 and the processor for bidirectional wireless communication. The communication element may provide point-to-point and/or point-to-multipoint communication services.

The communication element, such as a base station in a cellular network, may be coupled to a communication network element, such as a network control element 350 of a public switched telecommunication network. The network control element 350 may, in turn, be formed with a processor, memory, and other electronic elements (not shown). The network control element 350 generally provides access to a telecommunication network such as a public switched telecommunication network ("PSTN"). Access may be provided using fiber optic, coaxial, twisted pair, microwave communication, or similar link coupled to an appropriate link-terminating element. A communication element formed as a mobile station is generally a self-contained device intended to be carried by an end user.

The processor 310 in the communication element, which may be implemented with one or a plurality of processing devices, performs functions associated with its operation including, without limitation, encoding and decoding of individual bits forming a communication message, formatting of information, and overall control of the communication element, including processes related to management of resources. Exemplary functions related to management of resources include, without limitation, hardware installation, traffic management, performance data analysis, tracking of end users and mobile stations, configuration management, end user administration, management of the mobile station, management of tariffs, subscriptions, and billing, and the like. The execution of all or portions of particular functions or processes related to management of resources may be performed in equipment separate from and/or coupled to the communication element, with the results of such functions or processes communicated for execution to the communication element. The processor 310 of the communication element may be of any type suitable to the local application environment, and may include one or more of general-purpose computers, special-purpose computers, microprocessors, digital signal processors ("DSPs"), and processors based on a multicore processor architecture, as non-limiting examples.

The transceiver 330 of the communication element modulates information onto a carrier waveform for transmission by the communication element via the antenna to another communication element. The transceiver 330 demodulates information received via the antenna 340 for further processing by other communication elements.

The memory 320 of the communication element, as introduced above, may be of any type suitable to the local application environment, and may be implemented using any suitable volatile or nonvolatile data storage technology, such as a semiconductor-based memory device, a magnetic memory device and system, an optical memory device and system, fixed memory, and removable memory. The programs stored in the memory 320 may include program instructions that, when executed by an associated processor, enable the communication element to perform tasks as described herein. Exemplary embodiments of the system, subsystems, and modules as described herein may be implemented, at least in part, by computer software executable by processors of, for instance, the mobile station and the base station, or by hardware, or by combinations thereof. As will become more apparent, systems, subsystems and modules may be embodied in the communication element as illustrated and described above.

In an exemplary embodiment, the system introduced herein provides new "code points" and new use of training sequences for an EGPRS packet channel request message in order for a mobile station to be able to signal support for certain features in a packet channel request message such as an EGPRS packet channel request message, thereby enabling one-phase access to support these features. One-phase access enables faster establishment of uplink data transfer than two-phase access. Current practice is to use an existing EGPRS packet channel request message. This message is now amended in a system constructed according to the principles of the present invention to provide new additional information such as a latency reduction capability of the mobile station to be signaled to the communication system to support these features. There is no previous solution to the problem of providing access in only one-phase. The changes to 3GPP standards to provide this capability are relatively minor.

A system constructed according to the principles of the invention introduces and solves a new problem, namely, how to indicate the mobile station multi-slot transmission capability while not being able to indicate the mobile station exact multi-slot class when requesting one-phase access and indicating support of EGPRS2 ("EGPRS Phase 2") and/or latency reduction features. There are several alternative methods introduced herein to resolve the problem of indicating, upon random access of a mobile station to a base station, the support of EGPRS2 or latency-reduction features ("LATRED"), or both, in an uplink, described herein as methods A, B and C.

In EGPRS, the EGPRS packet channel request message was introduced to allow the indication for random mobile station access of the support of EGPRS and 8-PSK ("8-symbol phase shift keying") by means of training sequence signaling, as described in 3GPP TS 44.060, 3GPP TS 45.002, and in U.S. Pat. No. 6,870,858. This message enables the use of EGPRS with one-phase access, and hence avoids the time-consuming, two-phase access that would otherwise be needed to establish EGPRS TBF ("temporary block flow"). The EGPRS packet channel request can be used on a CCCH ("common control channel") and a PCCCH ("packet common control channel"). It is widely used in EDGE ("enhanced data rates for GSM evolution") networks deployed today.

With the introduction of EGPRS2 and LATRED features, a similar problem as that encountered in the EGPRS specification arises. It is not possible to indicate the support of LATRED features and/or EGPRS2 with one-phase access. In order not to force two-phase access at TBF establishment so as to enable the use of these features in an uplink, it is necessary to provide an indication of support of these features (i.e., LATRED, EGPRS2 in the uplink, or both LATRED and EGPRS2 in the uplink) with one-phase access. The issue of one-phase access has not been previously considered during the standardization of EGPRS2 and LATRED. The ability to provide one-phase access for these capabilities, while addressing the problem above, introduces and resolves a further problem that, due to the indication of support of EGPRS2 or LATRED features, or both, the exact mobile station multi-slot class cannot be indicated with one-phase access.

Support of one-phase access for these capabilities, i.e., LATRED, EGPRS2 in the uplink, or both LATRED and EGPRS2 in the uplink, can be provided as introduced herein by means of modifying as described hereafter an EGPRS packet channel request message, as specified in 3GPP TS 44.060 and 3GPP TS 45.002. As described in 3GPP TS 44.060, Subclause 11.2.5a, the EGPRS packet channel request message uses the 11-bit format access burst format on (P)RACH, as indicated in Tables 1 and 2 below, and described further in 3GPP TS 44.060. Other examples are provided in U.S. Pat. Nos. 6,870,858 and 7,058,132. These technical specifications and references are hereby referenced and incorporated herein by reference.

TABLE 1

EGPRS Packet Channel Request Message Content

| Training Sequence (3GPP TS 45.002) | Bits 11 . . . 1 | Packet Channel Access |
|---|---|---|
| TS1 | <EGPRS packet channel request message content> | EGPRS with 8PSK capability in uplink |
| TS2 | <EGPRS packet channel request message content> | EGPRS without 8PSK capability in uplink |

TABLE 2

EGPRS Packet Channel Request Message Content
EGPRS Packet Channel Request Message Content

| One-phase Access Request: | 0 | Multi-slot Class: bit (5) Priority: bit (2) Random Bits: bit (3) |
|---|---|---|
| Short Access Request: | 100 | The value 100 was allocated in an earlier version of the protocol and may not be used by the mobile station Number of Blocks: bit (3) Priority: bit (2) Random Bits: bit (3) |
| Two-phase Access Request: | 110000 | Priority: bit (2) Random Bits: bit (3) |
| Signaling: | 110011 | Random Bits: bit (5) |
| One-Phase Access Request in RLC Unack Mode: | 110101 | Random Bits bit (5) |
| Dedicated Channel Request: | 110110 | Random Bits: bit (5) |
| Emergency Call: | 110111 | Random Bits: bit (5) |

Note that from Table 2 above it can be seen that cause values '101xxxxxxxx' and '111xxxxxxxx' are unused, and that cause values '101xxxxxxxx' cannot be used.

As can be seen from Table 2, when EGPRS one-phase access is requested, the EGPRS multi-slot class is indicated (see Table 11) which corresponds to the multi-slot classes defined in 3GPP TS 45.002, reproduced below as Table 3. It should be noted that multi-slot classes 1 to 29 can be indicated at one-phase access. It is important to include the transmit capabilities of mobile station in the one-phase access in order for the network to be able to account for these capabilities when assigning uplink resources to the mobile station in response to the one-phase access. The table below is a reference to the currently specified multi-slot classes.

TABLE 3

Multi-Slot Classes

| Multi-slot class | Maximum number of slots | | | Minimum number of slots | | | | Type |
|---|---|---|---|---|---|---|---|---|
| | Rx | Tx | Sum | $T_{ta}$ | $T_{tb}$ | $T_{ra}$ | $T_{rb}$ | |
| 1 | 1 | 1 | 2 | 3 | 2 | 4 | 2 | 1 |
| 2 | 2 | 1 | 3 | 3 | 2 | 3 | 1 | 1 |
| 3 | 2 | 2 | 3 | 3 | 2 | 3 | 1 | 1 |
| 4 | 3 | 1 | 4 | 3 | 1 | 3 | 1 | 1 |
| 5 | 2 | 2 | 4 | 3 | 1 | 3 | 1 | 1 |
| 6 | 3 | 2 | 4 | 3 | 1 | 3 | 1 | 1 |
| 7 | 3 | 3 | 4 | 3 | 1 | 3 | 1 | 1 |
| 8 | 4 | 1 | 5 | 3 | 1 | 2 | 1 | 1 |
| 9 | 3 | 2 | 5 | 3 | 1 | 2 | 1 | 1 |
| 10 | 4 | 2 | 5 | 3 | 1 | 2 | 1 | 1 |
| 11 | 4 | 3 | 5 | 3 | 1 | 2 | 1 | 1 |
| 12 | 4 | 4 | 5 | 2 | 1 | 2 | 1 | 1 |
| 13 | 3 | 3 | NA | NA | a) | 3 | a) | 2 |
| 14 | 4 | 4 | NA | NA | a) | 3 | a) | 2 |
| 15 | 5 | 5 | NA | NA | a) | 3 | a) | 2 |
| 16 | 6 | 6 | NA | NA | a) | 2 | a) | 2 |
| 17 | 7 | 7 | NA | NA | a) | 1 | 0 | 2 |
| 18 | 8 | 8 | NA | NA | 0 | 0 | 0 | 2 |
| 19 | 6 | 2 | NA | 3 | b) | 2 | c) | 1 |
| 20 | 6 | 3 | NA | 3 | b) | 2 | c) | 1 |
| 21 | 6 | 4 | NA | 3 | b) | 2 | c) | 1 |
| 22 | 6 | 4 | NA | 2 | b) | 2 | c) | 1 |
| 23 | 6 | 6 | NA | 2 | b) | 2 | c) | 1 |
| 24 | 8 | 2 | NA | 3 | b) | 2 | c) | 1 |
| 25 | 8 | 3 | NA | 3 | b) | 2 | c) | 1 |
| 26 | 8 | 4 | NA | 3 | b) | 2 | c) | 1 |
| 27 | 8 | 4 | NA | 2 | b) | 2 | c) | 1 |
| 28 | 8 | 6 | NA | 2 | b) | 2 | c) | 1 |

TABLE 3-continued

Multi-Slot Classes

| Multi-slot class | Maximum number of slots | | | Minimum number of slots | | | | Type |
|---|---|---|---|---|---|---|---|---|
| | Rx | Tx | Sum | $T_{ta}$ | $T_{tb}$ | $T_{ra}$ | $T_{rb}$ | |
| 29 | 8 | 8 | NA | 2 | b) | 2 | c) | 1 |
| 30 | 5 | 1 | 6 | 2 | 1 | 1 | 1 | 1 |
| 31 | 5 | 2 | 6 | 2 | 1 | 1 | 1 | 1 |
| 32 | 5 | 3 | 6 | 2 | 1 | 1 | 1 | 1 |
| 33 | 5 | 4 | 6 | 2 | 1 | 1 | 1 | 1 |
| 34 | 5 | 5 | 6 | 2 | 1 | 1 | 1 | 1 |
| 35 | 5 | 1 | 6 | 2 | 1 | 1 + to | 1 | 1 |
| 36 | 5 | 2 | 6 | 2 | 1 | 1 + to | 1 | 1 |
| 37 | 5 | 3 | 6 | 2 | 1 | 1 + to | 1 | 1 |
| 38 | 5 | 4 | 6 | 2 | 1 | 1 + to | 1 | 1 |
| 39 | 5 | 5 | 6 | 2 | 1 | 1 + to | 1 | 1 |
| 40 | 6 | 1 | 7 | 1 | 1 | 1 | to | 1 |
| 41 | 6 | 2 | 7 | 1 | 1 | 1 | to | 1 |
| 42 | 6 | 3 | 7 | 1 | 1 | 1 | to | 1 |
| 43 | 6 | 4 | 7 | 1 | 1 | 1 | to | 1 |
| 44 | 6 | 5 | 7 | 1 | 1 | 1 | to | 1 |
| 45 | 6 | 6 | 7 | 1 | 1 | 1 | to | 1 |

However, it can be seen in Table 2 that it is not currently possible to request one-phase access while indicating the mobile station support for EGPRS2 in uplink and/or LATRED. Therefore, it is not possible to use either of these features at one-phase access. As seen in Table 2, it is currently only possible to indicate the mobile station support for EGPRS (with/without 8-PSK) in uplink when requesting one-phase access.

A first exemplary method (designated method A) of the system as described herein introduces and utilizes the unused "cause values" listed in Table 2, combined with the identification of which training sequence (TS1, TS2) is received, to indicate that one-phase access is requested and that the mobile station supports EGPRS2 with/without LATRED features. For EGPRS, the support of LATRED features is done by using the unused multi-slot class indication of the current one-phase access. The multi-slot class indicator is a five bit field. The first 29 combinations out of 32 possible are currently used.

A second exemplary method (designated method B) of the system as described herein introduces and provides, for EGPRS and EGPRS2 mobile stations, an indication of the support (or lack thereof) of LATRED features at one-phase access, and subsequent indication of EGPRS2 support (EGPRS2-B and/or EGPRS2-A support) in the uplink during the contention resolution phase within the RLC/MAC header of the data blocks sent by the mobile station to the base station.

A third exemplary method (designated method C) of the system as described herein introduces a new EGPRS2 packet channel request message using a new encoding of the 11-bit access burst. The identification of which encoding of the 11-bit access burst is used (i.e., packet random access channel ("PRACH") encoding as defined in 3GPP TS 45.003, which is incorporated herein by reference verses altered PRACH encoding with negating cyclic redundancy check bits before being colorized) to indicate whether an EGPRS packet channel request message or an EGPRS2 packet channel request message is being used, and indicates further whether EGPRS2 with/without LATRED features are supported. For a more information associated herewith, see U.S. Pat. No. 7,058,132.

The exemplary methods in accordance with the system as described herein introduce a new "multi-slot hyper class" to allow the indication of the mobile station's multi-slot transmit capability (or at least a portion thereof) to the communication system (e.g., the base station), while not being able to indicate the exact multi-slot class when the mobile station indicates support for EGPRS2 and/or LATRED features with one-phase access.

The specifications 3GPP TS 44.060, 3GPP TS 43.064, which are incorporated herein by reference, state that a mobile station supporting EGPRS2 shall support EGPRS, and that a mobile station supporting EGPRS2 in the uplink shall support EGPRS with 8-PSK capability in the uplink. In the specification of LATRED features (such as reduced transmission time interval ("RTTI") and fast ack/nack reporting ("FANR")) the specifications state that a mobile station supporting LATRED shall support both FANR and RTTI, and that a mobile station supporting LATRED shall support EGPRS.

Thus, an apparatus (e.g., user equipment such as a mobile station or part thereof) for use with a wireless communication system is introduced herein. In one embodiment, the apparatus includes a processor configured to create a packet channel request message such as an EGPRS packet channel request message enabling one-phase access including an indication of the mobile station's EGPRS2 capability and/or its latency reduction LATRED capability. The apparatus also includes a transceiver configured to transmit the EGPRS packet channel request message. In another embodiment, an apparatus (e.g., a base station or part thereof) includes a transceiver configured to receive an EGPRS packet channel request message, and a processor that in response to the EGPRS packet channel request message may provide a wireless channel to user equipment such as a mobile station to transmit an information message.

In another embodiment, a wireless communication system including user equipment such as a mobile station and a base station is introduced herein. In one embodiment, the mobile station includes a mobile station processor that creates an EGPRS packet channel request message enabling one-phase access including an indication of the mobile station's EGPRS2 capability and/or its latency reduction capability and a mobile station transceiver that transmits the EGPRS packet channel request message. The base station includes a base station transceiver that receives the EGPRS packet channel request message, and a base station processor that in response to the EGPRS packet channel request message may provide a wireless channel to the mobile station to transmit an information message.

Referring now to the exemplary method referred to as method A, there are suggested modifications to be considered. To address the present deficiencies in the specifications in accordance with the principles of the invention, at one-phase access, the support of EGPRS2 (for the uplink) and LATRED features is indicated by means of training sequences TS1, TS2, and unused '1x1xxxxxxxx' cause values of the EGPRS packet channel request message as follows. TS1, '1x1xxxxxxxx', indicates support of EGPRS2-A and EGPRS2-B in the uplink, and TS2, '1x1xxxxxxxx', indicates support of EGPRS2-A in the uplink.

When an EGPRS packet channel request message, such as illustrated in Tables 4 and 5 below, is received with the cause values above, the second leftmost bit or field indicates whether LATRED is supported ('1') or not supported ('0'). This leaves 8 bits to accommodate the radio priority (2 bits), the random bits (3 bits) and the multi-slot class (5 bits). It is necessary, however, to preserve the indication of radio priority and random bits. Therefore, in an embodiment, while it is not possible to indicate the exact multi-slot class (5 bits) it is preferable to indicate instead a multi-slot hyper class (3 bits) that would nonetheless allow the indication of appropriate transmit ("Tx") capabilities of the mobile station to the communication system (e.g., base station), at least on how many timeslots the mobile station is able to transmit. A possible relationship between multi-slot class and multi-slot hyper class is shown in Table 12 and Table 13. The multi-slot hyper class differs between a LATRED-capable mobile station and a non-LATRED-capable mobile station, given RTTI usage implies, at minimum, the support of Rx=2, Tx=2, sum=4, i.e., two receive and two transmit slots, a total of four slots.

Table 2), the last three values ('11101', '11110', '11111') are reserved, which could be used to indicate LATRED support when one-phase access is requested.

The following indications would be provided through the multi-slot class. An "11101" when one-phase access is requested, this indicates the mobile station multi-slot class allows 2 or 3 Tx slots (i.e., multi-slot classes 5, 6, 7, 9, 10, 11, 19, 20, 24, 25, 31, 32, 37, 41, and 42). A "11110" when one-phase access is requested indicates the mobile station multi-slot class allows 4 or 5 Tx slots (i.e., multi-slot classes 12, 38, 21, 22, 26, 27, 33, 34, 39, 43, and 44). A "11111" when one-phase access is requested indicates the mobile station multi-slot class allows at least 6 Tx slots (i.e., multi-slot classes 23, 28, 29, and 45).

Thus, in accordance with the wireless communication system as introduced in method A, the EGPRS packet channel request message includes cause values combinable with selection of a training sequence message to indicate mobile station support of EGPRS2 and/or LATRED features. A bit or field (e.g., a $2^{nd}$ leftmost bit of the 11 bits) of the cause values may be employed to indicate support of the LATRED capability. The cause values may also include a multi-slot class field that provides a multi-slot class of transmission capability of the mobile station, which supports EGPRS2. For a mobile station supporting EGPRS but not EGPRS2, the multi-slot class field indicated when one-phase access is requested by the EGPRS packet channel request message may be employed to signal support of LATRED capability and of some multi-slot transmission capability.

Referring now to the exemplary method referred to as method B, in accordance with an indication of LATRED support, an aspect of method B is capability for early assignment of RTTI configuration, whether the mobile station supports EGPRS or EGPRS2, and a multi-slot hyper class of 4

TABLE 4

EGPRS Packet Channel Request Message Content

| Training Sequence (3GPP TS 45.002) | Bits 11 ... 1 | Packet Channel Access |
|---|---|---|
| TS1 | <EGPRS Packet channel request message content> | EGPRS with 8PSK capability in uplink. If received in combination with 1x1xxxxxxxx cause values: EGPRS with 8PSK capability in uplink; and EGPRS2-A and EGPRS2-B |
| TS2 | <EGPRS Packet channel request message content> | EGPRS without 8PSK capability in uplink If received in combination with 1x1xxxxxxxx cause values: EGPRS with 8PSK capability in uplink; and EGPRS2-A |

TABLE 5

EGPRS Packet Channel Request Message Content

```
< EGPRS packet channel request message content > ::=
    < One-phase Access Request :                        0           < Multi-slot Class : bit (5) >
                                                                    < Priority : bit (2) >
                                                                    < Random Bits : bit (3) >>
    | < Short Access Request :                          100         -- The value 100 was
allocated in an earlier version of the protocol and shall not be used by the mobile station
        < Number Of Blocks : bit (3) >
        < Priority : bit (2) >
        < Random Bits : bit (3) >>
    | < EGPRS2 OPA Request no FANR RTTI                 101         < Multi-slot Hyper Class 1: bit(3) >
                                                                    < Priority: bit (2) >
                                                                    < Random Bits : bit (3) >>
    | < Two-phase Access Request:                       110000      < Priority: bit (2) >
                                                                    < Random Bits : bit (3) >>
    | < EGPRS2 OPA Request FANR RTTI                    111         < Multi-slot Hyper Class 2: bit(3) >
                                                                    < Priority : bit (2) >
                                                                    < Random Bits : bit (3) >>
    | < Signaling :                                     110011      < Random Bits : bit (5) >>
    | < One-phase Access Request in RLC unack mode :                110101      < Random Bits
: bit (5) >>
    | < Dedicated Channel Request :                     110110      < Random Bits : bit (5) >>
    | < Emergency call :                                110111      < Random Bits : bit (5) >>;
```

A remaining open issue is indication of LATRED support for EGPRS. This is an issue primarily for RTTI usage that has a very specific media access control ("MAC") behavior (timeslot allocation, uplink state flag ("USF") monitoring). Hence, the only possibility would be to indicate this support at random access. This open issue is addressed for method A as described below for changes for EGPRS with LATRED. In accordance with the changes for EGPRS with LATRED, in the multi-slot class field sent at one-phase access (as seen in bits or less (see Table 14). The support of EGPRS2 is signaled separately, during contention resolution at one-phase access, within uplink RLC/MAC blocks for data transfer.

In this method, to indicate simultaneously that one-phase access is requested and LATRED features are supported, the unused '1x1xxxxxxxx' cause values are used as follows, namely, '1m1mmmpprrr' indicates one-phase access, LATRED features supported, and the meanings of training sequences TS1 and TS2 are unchanged (e.g., 8-PSK modulation supported in uplink, 8-PSK modulation not supported in uplink). With reasoning similar to that for method A, a multi-slot hyper class (4 bits or less) is employed. The 9 bits 'mmmmpprrr' are assigned to multi-slot hyper class (4 bits), radio priority (2 bits), and random bits (3 bits). See Tables 6 and 7 that follow for further support.

TABLE 6

EGPRS Packet Channel Request Message Content

| Training Sequence (3GPP TS 45.002) | Bits 11 . . . 1 | Packet Channel Access |
|---|---|---|
| TS1 | <EGPRS packet channel request message content> | EGPRS with 8PSK capability in uplink. |
| TS2 | <EGPRS packet channel request message content> | EGPRS without 8PSK capability in uplink |

TABLE 7

EGPRS Packet Channel Request Message Content

```
< EGPRS packet channel request message content > ::=
    < One-phase Access Request :              0           < Multi-slot Class : bit (5) >
                                                          < Priority : bit (2) >
                                                          < Random Bits : bit (3) >
>>
  | < Short Access Request :                  100 -- The value 100 was allocated in
an earlier version of the protocol and shall not be used by the mobile station
        < Number Of Blocks : bit (3) >
        < Priority : bit (2) >
        < Random Bits : bit (3) >>
  | < OPA Request FANR RTTI                   1m1mmmpprrr
  | < Two-phase Access Request :              110000      < Priority : bit (2) >
                                                          < Random Bits : bit (3) >
>>
  | < Signaling :                             110011      < Random Bits : bit (5) >
>>
  | < One-phase Access Request in RLC unack mode :  110101  < Random Bits : bit (5) >
>>
  | < Dedicated Channel Request :             110110      < Random Bits : bit (5) >
>>
  | < Emergency call :                        110111      <Random Bits : bit (5) >
Where:
    mmmm   contains the < Multi-slot Hyper Class : bit (4) >
    pp     contains the < Priority : bit(2) >
    rrr    contains the < Random Bits : bit (3) >
```

Note that a smaller multi-slot hyper class could also be defined (e.g., 3 bits as in method A), hence leaving some cause value for future use.

Continuing with the exemplary method referred to as method B, in accordance with an indication of EGPRS2 support, during contention resolution at one-phase access, the mobile station transmits uplink RLC data blocks to the base station. It can be observed that both EGPRS2-A and EGPRS2-B contain EGPRS modulation and coding schemes ("MCSs") as part of their modulation and coding scheme families, as shown below, therefore starting by sending MCSs within these families will allow the subsequent use of EGPRS2-specific modulation and coding schemes without any disruption at RLC, and with little impact to the data transfer during contention resolution, since the communication system does not have link quality measurements available at this time that could otherwise allow starting with a high modulation and coding scheme.

Exemplary families (typically defined by a size of a payload unit) and modulation and coding schemes are set forth below.

TABLE 8

Families and MCSs

| EGPRS2-A | |
|---|---|
| Family A | MCS-3 (37 bytes); MCS-6 (74 bytes); UAS-9 (2 × 74 bytes) |
| Family B | MCS-2 (28 bytes); MCS-5 (56 bytes); UAS-7/10 (2/3 × 56 bytes) |
| Family C | MCS-1 (22 bytes); MCS-4 (44 bytes) |
| EGPRS2-B | |
| Family A | MCS-3 (37 bytes); UBS-6/8/10/12 (1/2/3/4 × 74 bytes) |
| Family B | MCS-2 (28 bytes); UBS-5/7/9 (1/2/3 × 56 bytes) |
| Family C | MCS-1 (22 bytes); MCS-4 (44 bytes) |

The following observations can be made. The mobile station assigned only an uplink TBF (which is especially true during contention resolution) and using reduced latency will not send any piggy-backed ack/nack ("PAN," there is no downlink TBF ongoing for this mobile station (e.g., the piggy-backed ack/nack indicator ("PANI") bit is meaningless)). The RSB bit has not been introduced for EGPRS2, but remains in the EGPRS uplink RLC/MAC headers, although it is likely that it will be unused.

It is therefore proposed that during contention resolution at one-phase access the EGPRS2-capable mobile station indicate within the RLC/MAC header of the RLC/MAC blocks for data transfer whether it supports {EGPRS2-A} or {EGPRS2-B}. This indication can be done by using one bit to indicate EGPRS2 support in the uplink, and another bit to indicate whether {EGPRS2-A} or {EGPRS2-B} are supported. Based on the observations above, the (PANI/one spare bit) and RSB bit could be reused for that purpose. This indication is included within the header type 2 (used for MCS-5 and MCS-6) and header type 3 (used for MCS-1 to MCS-4). No modification is required for header type 1, since it is proposed that MCS-7 to MCS-9 will not be used during contention resolution, as described below.

In case the mobile station is assigned an uplink, EGPRS TBF is performed using reduced latency, as illustrated in FIGS. 4, 5, 6, and 7, illustrating respectively an RLC/MAC header type 2 (MCS-5 and MCS-6) with reduced latency, an RLC/MAC header type 3 (MCS-1 to MCS-4) with reduced latency, an RLC/MAC header type 2 (MCS-5 and MCS-6) without reduced latency, and an RLC/MAC header type 3 (MCS-1 to MCS-4) without reduced latency. In an exemplary embodiment, the meaning of PANI/E2S (wherein E2S refers to EGPRS2 support indicator) and RSB bits are assigned as illustrated in FIG. 8 during contention resolution. The combination of PANI/E2S and RSB is used to indicate EGPRS2 capability.

During contention resolution, the mobile station shall obey the following rule. If the mobile station is ordered to use a specific commanded MCS by the network (i.e., in the assignment message following the random access), the mobile station may use that MCS if it belongs to the EGPRS2-A modulation and coding schemes (mobile station not supporting EGPRS2-B) or EGPRS2-B modulation and coding schemes (mobile station supporting EGPRS2-B) and, if not, it may use the next MCS, in the same family as depicted in Table 9 below.

TABLE 9

MCS to Use During Contention Resolution as a Function of the Commanded MCS

| MS | Commanded MCS (Family) | | | | | | | | |
|---|---|---|---|---|---|---|---|---|---|
| EGPRS2 UL support | MCS-1 (C) | MCS-2 (B) | MCS-3 (A) | MCS-4 (C) | MCS-5 (B) | MCS-6 (A) | MCS-7 (B) | MCS-8 (A pad) | MCS-9 (A) |
| EGPRS2-A no EGPRS2-B | MCS-1 | MCS-2 | MCS-3 | MCS-4 | MCS-5 | MCS-6 | MCS-5 | MCS-6 No padding | MCS-6 |
| EGPRS2-B | MCS-1 | MCS-2 | MCS-3 | MCS-4 | MCS-2 | MCS-3 | MCS-2 | MCS-3 No padding | MCS-3 |

Thus, in accordance with the wireless communication system as introduced in method B, the EGPRS packet channel request message includes cause values employed to request one-phase access and signal support of the LATRED capability for EGPRS or EGPRS2, and support of EGPRS2 is signaled during a contention resolution at one-phase access in a radio link control/media access control header of data blocks transmitted by the mobile station to the base station. If the one-phase access and support of LATRED is indicated, the corresponding cause values may also include a multi-slot hyper class field employed to indicate transmit capabilities of the mobile station to the base station. The processor of the mobile station may also create a training sequence message to signal 8-symbol phase-shifted keying ("8-PSK") capability thereof. The processor of the mobile station supporting EGPRS2 creates a radio link control/media access control header of data blocks to indicate the mobile station's support of EGPRS2-A or EGPRS2-A and EGPRS2-B, wherein a bit is employed to indicate EGPRS2 support and another bit to indicate EGPRS2-A or EGPRS2-A and EGPRS2-B support.

Referring now to the exemplary method referred to as method C, in accordance with an indication of LATRED support for EGPRS, with this method, the support of LATRED for EGPRS is indicated in an analogous way as for method B. In other words, the support is indicated by using one of the unused code points and introducing a 4-bit (or fewer) multi-slot hyper class. Continuing with exemplary method referred to as method C, in accordance with an indication of EGPRS2 support, the indication of EGPRS2 support is done by means of new encoding of the 11-bit access burst. The detection of this new coding would indicate EGPRS2 is supported. For an example thereof, see U.S. Pat. No. 7,058,132.

This method suggests indicating the EGPRS2 support to the communication system by alteration in the channel coding for the extended packet access burst (see 3GPP TS 45.003, which is incorporated herein by reference). The steps of channel coding for the extended packet access burst can be summarized as calculation of six parity bits, coloring the six parity bits by six bits of base station identity code ("BSIC"), convolutional encoding with a rate ½ convolutional encoder, and puncturing to a block length of 36 bits. The coloring is bit-wise modulo 2 addition of the parity bits and BSIC.

The EGPRS2 support is preferably indicated by negation of the six parity bits before coloring is performed. The mobile station supporting EGPRS2 would perform encoding for the extended packet access burst in the following steps, namely, calculation of six parity bits, negation of the six parity bits, coloring the six negated parity bits by six bits of BSIC, convolutional encoding with ½-rate convolutional encoder, and puncturing to the block length of 36 bits. This method allows defining a new EGPRS2 packet channel request message, as indicated in Table 10, below, distinct from the EGPRS packet channel request message. It would be used if supported by the communication system, and when one-phase access is requested.

TABLE 10

EGPRS Packet Channel Request Message Content

< EGPRS2 Packet channel request message content > ::=
    < EGPRS2-A One-phase Access Request no LATRED:    00< Multi-slot Hyper Class : bit (4) >
                                                                                < Priority : bit (2) >
                                                                                < Random Bits : bit (3) >>
    | < EGPRS2-A One-phase Access Request LATRED:    01< Multi-slot Hyper Class : bit (4) >
                                                                                < Priority : bit (2) >
                                                                                < Random Bits : bit (3) >>

TABLE 10-continued

EGPRS Packet Channel Request Message Content

| < EGPRS2-B One-phase Access Request no LATRED:   10< Multi-slot Hyper Class : bit (4) >
                                                      < Priority : bit (2) >
                                                      < Random Bits : bit (3) >>
| < EGPRS2-B One-phase Access Request no LATRED:   11< Multi-slot Hyper Class : bit (4) >
                                                      < Priority : bit (2) >
                                                      < Random Bits : bit (3) >>;

The 4-bit (or lower) multi-slot hyper class is defined in Table 14 (or 3-bit in Table 12 and Table 13). It is noted that coding with the 3-bit multi-slot hyper class indicator should be considered for the coding of the EGPRS2 packet channel request message. This would provide spare combinations for future use (e.g., EGPRS2-C).

Thus, in accordance with the wireless communication system as introduced in method C, the EGPRS packet channel request message includes cause values employed by a mobile station supporting EGPRS but not EGPRS2 to request one-phase access and signal support of the LATRED capability. The cause values may also include a multi-slot hyper class field to indicate transmit capabilities of the mobile station to the base station. In a related embodiment, a new EGPRS2 packet channel request message is introduced to indicate the mobile station supports EGPRS2. The EGPRS2 packet channel request message includes cause values employed by a mobile station to request one-phase access, signal support of EGPRS2-A or EGPRS2-A and EGPRS2-B, and of LATRED capability. The cause values may also include a multi-slot hyper class field to indicate transmit capabilities of the mobile station to the base station. The EGPRS2 packet channel request message is distinguished from the EGPRS packet channel request message by negating six parity bits before coloring the EGPRS2 packet channel request message. The processor of the mobile station may use this to signal EGPRS2 support.

Turning now to multi-slot hyper class and mapping of multi-slot class to multi-slot hyper class, in general, the need for multi-slot hyper class arises from the inability to signal the actual multi-slot class (5 bits) at random access as per methods A, B and C above. It is therefore necessary to operate a grouping of multi-slot classes while preserving, as far as possible, the information pertaining to uplink capabilities of the mobile station, given that random access is used by the mobile station to request uplink resources from the communication system.

The multi-slot class field (5 bits) indicates the EGPRS multi-slot class of the mobile station. The multi-slot class indicated by this field may be the same as the EGPRS multi-slot class indicated in the mobile station radio access capability information element ("IE") (See 3GPP TS 24.008, which is incorporated herein by reference). The multi-slot class coding is defined in Table 11 below.

TABLE 11

Multi-Slot Class Coding

| Bit 5 | Bit 4 | Bit 3 | Bit 2 | Bit 1 | |
|---|---|---|---|---|---|
| 0 | 0 | 0 | 0 | 0 | Multi-Slot Class 1 |
| 0 | 0 | 0 | 0 | 1 | Multi-Slot Class 2 |
| ... | ... | ... | ... | ... | ... |
| 1 | 1 | 1 | 0 | 0 | Multi-Slot Class 29 |
| other | | | | | Reserved Values |

It is noted that not all of the information contained within the definition of a multi-slot class is for allowing a valid assignment to be made quickly (such as during one-phase access). Furthermore, several multi-slot classes that are currently defined have not been, and remain unlikely to be implemented. On the other hand, there is currently no possibility to indicate support of higher (class 30+) multi-slot classes. It should be noted that the multi-slot classes are defined in the Annex of 3GPP TS 45.002.

With respect to the principles of mapping, the grouping of multi-slot classes should follow the principle that it is the transmit capabilities of the mobile station that are important (since an EGPRS packet channel request implies a request for uplink ("UL") resources). Classes which differ only in the maximum number of receive timeslots should be grouped together. Classes could be grouped together by assuming that a base station does not implement timing offset.

Minimum switching times/Tx/Rx capabilities can be assumed for EGPRS2 and LATRED-capable mobile stations as follows. For EGPRS2, minimum multi-slot class 5 is Tx=2, Rx=2. For LATRED, minimum requirement is for Tx≥2. It should be taken into account that the communication system should assume the worst possible case (i.e., it will assume the lowest capabilities of all classes in a group) and that higher-capability classes within a group should not be excessively penalized.

Regarding the principles of mapping to 3 bits without LATRED support, the following rules are used to construct the mapping. Type 2 mobile stations and classes lower than 5 are typically not considered. Type 1 mobile station is not required to transmit and receive at the same time. Type 2 mobile station typically has the ability to transmit and receive at the same time. The basic mapping is performed by Tx value and mobile station classes wherein Tx≥6 are grouped together. A secondary mapping is by time ready to receive ("Tra") value and time ready to transmit ("Tta") value is very rarely applicable (see 3GPP TS 45.002).

This results in the following mapping as illustrated in Table 12 below.

TABLE 12

3-bit coding for EGPRS2 (non-LATRED)

| Group | Coding | Tx | Tra | Contains Multi-slot classes: |
|---|---|---|---|---|
| 1 | 000 | 1 | | 8, 30, 35, 40 |
| 2 | 001 | 2 | 2, 3 | 5, 6, 9, 10, 19, 24, 36 |
| 3 | 010 | | 1 | 31, 41 |
| 4 | 011 | 3 | 2, 3 | 7, 11, 20, 25, 37 |
| 5 | 100 | | 1 | 32, 42 |
| 6 | 101 | 4 | | 12, 21, 22, 26, 27, 38, 33, 43 |
| 7 | 110 | 5 | | 34, 39, 44 |
| 8 | 111 | 6+ | | 23, 28, 29, 45 |

Regarding the principles of mapping to 3 bits with LATRED support, the same mapping could be used as above. However, the following points are relevant to LATRED. The RTTI assignments will include one or more packet data channel pairs ("PDCH'-pairs, wherein the pairs are likely to include contiguous PDCHs (there is no need for non-contiguous pairs except in dual transfer mode ("DTM") operation, or when multiplexing with a DTM mobile). The lower bound for RTTI is that Tx≥2 (i.e., Group 1 above is typically not possible). One simple option is to re-use the code-point for Group 1 above to provide greater granularity for Group 6, as illustrated in Table 13.

TABLE 13

3-bit coding for EGPRS2 (non-LATRED)

| Group | Coding | Tx | Tra | Contains Multi-slot classes: |
|---|---|---|---|---|
| 2 | 001 | 2 | 2, 3 | 5, 6, 9, 10, 19, 24, 36 |
| 3 | 010 |  | 1 | 31, 41 |
| 4 | 011 | 3 | 2, 3 | 7, 11, 20, 25, 37 |
| 5 | 100 |  | 1 | 32, 42 |
| 6 | 101 | 4 | 2 | 12, 21, 22, 26, 27, 38 |
| 6bis | 000 | 4 | 1 | 33, 43 |
| 7 | 110 | 5 |  | 34, 39, 44 |
| 8 | 111 | 6+ |  | 23, 28, 29, 45 |

Regarding the principles of mapping to 4 bits, for a 4-bit multi-slot class, grouping could again be done principally based on Tx capability, and also on Rx capability. In other words, the capability of transmit/receive on a certain number of time slots. One possibility is indicated in Table 14.

TABLE 14

4-Bit Coding for EGPRS2

| Group | Coding | Tx | Rx* | Contains Multi-slot classes: |
|---|---|---|---|---|
| 1 | 0000 | 1 |  | 8, 30, 35, 40 |
| 2 | 0001 | 2 |  | 5, 6, 9 |
| 3 | 0010 | 2 |  | 10, 36 |
| 4 | 0011 | 2 |  | 19, 24 |
| 5 | 0100 | 2 |  | 31, 41 |
| 6 | 0101 | 3 |  | 7 |
| 7 | 0110 | 3 |  | 11, 37 |
| 8 | 0111 | 3 |  | 20, 25 |
| 9 | 1000 | 3 |  | 32, 42 |
| 10 | 1001 | 4 |  | 12, 38 |
| 11 | 1010 | 4 |  | 21, 22 |
| 12 | 1011 | 4 |  | 26, 27 |
| 13 | 1100 | 4 |  | 33, 43 |
| 14 | 1101 | 5 |  | 34, 39, 44 |
| 15 | 1110 | 6+ |  | 23, 28, 29, 45 |
| 16 | 1111 |  |  | Reserved |

*assumes offset not used in BTS, at least 1 UL TS assigned

Figure 9:
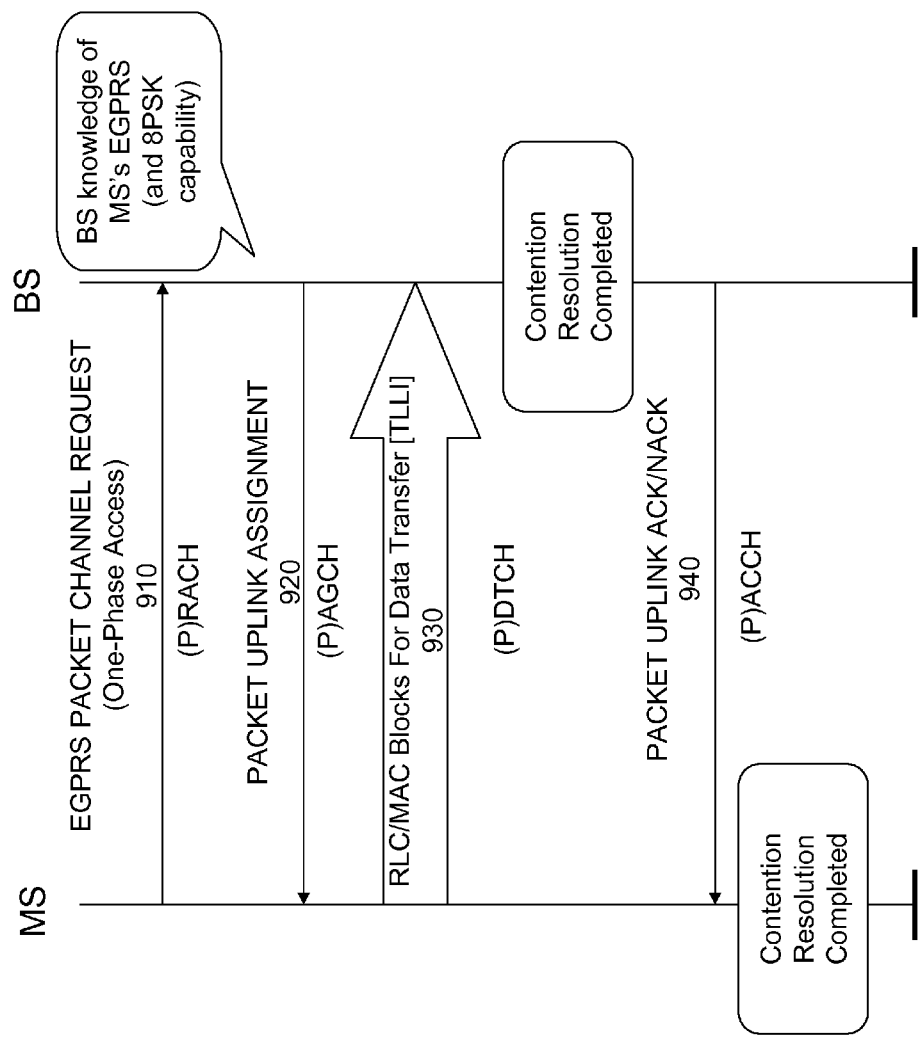
FIG. 9 illustrates a signaling diagram of information presently exchanged between a mobile station and a base station for existing EGPRS signaling arrangements.

Turning now to FIG. 9, the information presently exchanged between a mobile station (designated "MS") and a base station (designated "BS") is illustrated for existing EGPRS signaling arrangements, wherein the base station determines the mobile station's EGPRS and 8PSK capability. The mobile station makes an EGPRS packet channel request on a packet random access channel ("(P)RACH") to a serving base station, signaling one-phase access (designated 910). The base station replies to the mobile station with a packet uplink assignment on a packet access grant channel ("(P) AGCH") (designated 920). The mobile station transfers radio link control/media access control ("RLC/MAC") blocks of data to the base station on a packet data traffic channel ("(P) DTCH") including its temporary logical link indicator ("TLLI") (designated 930). The base station then performs contention resolution, and replies to the mobile station with a packet uplink acknowledge/no acknowledge signal including the contention resolution TLLI on a packet associated control channel ("(P)ACCH") (designated 940). When the mobile station receives the packet uplink acknowledge/no acknowledge signal including the contention resolution TLLI, the contention resolution at EGPRS one-phase access is completed.

Figure 10:
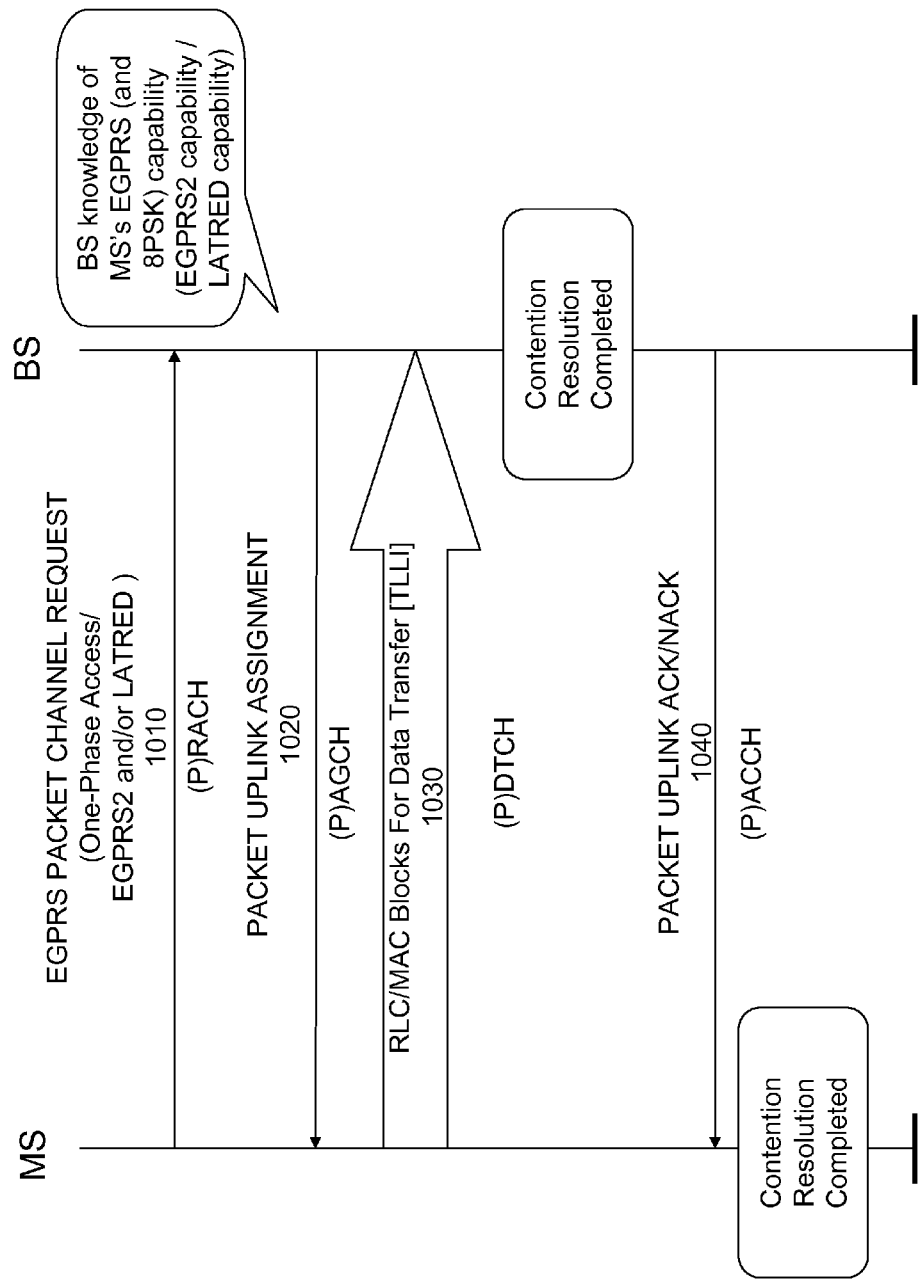
FIGS. 10, 11, and 12 illustrate signaling diagrams of embodiments of information exchanged between a mobile station and a base station for exemplary methods constructed according to principles of the present invention.

Turning now to FIG. 10, the information exchanged between a mobile station (designated "MS") and a base station (designated "BS") is illustrated following method A, constructed according to the principles of the invention, wherein the base station determines the mobile station's EGPRS, 8PSK and LATRED capability, and the mobile station's EGPRS2 and LATRED capability. The mobile station makes a packet channel request such as an EGPRS packet channel request on a packet random access channel ("(P) RACH") to a serving base station, signaling with one-phase access, including the mobile station's EGPRS, 8-PSK and LATRED capability or EGPRS2 capability and/or LATRED capability (designated 1010). The base station replies to the mobile station with a packet uplink assignment on a packet access grant channel ("(P)AGCH") (designated 1020). The mobile station transfers radio link control/media access control ("RLC/MAC") blocks of data to the base station on a packet data traffic channel ("(P)DTCH") including its temporary logical link indicator ("TLLI") (designated 1030). The base station then performs contention resolution, and replies to the mobile station with a packet uplink acknowledge/no acknowledge signal including the contention resolution TLLI on a packet associated control channel ("(P)ACCH") (designated 1040). When the mobile station receives the packet uplink acknowledge/no acknowledge signal including the contention resolution TLLI, the contention resolution at EGPRS one-phase access is completed.

Figure 11:
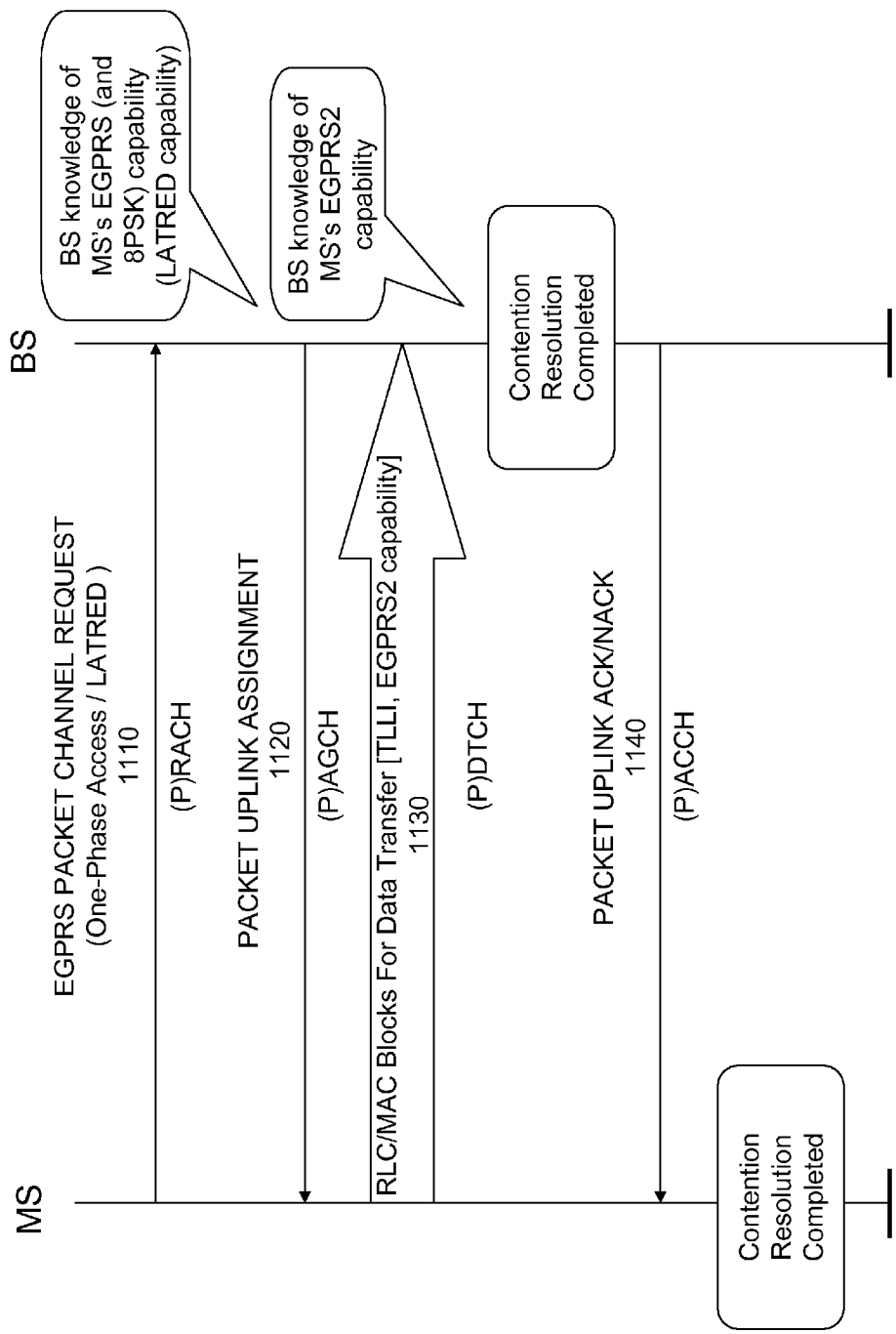

Turning now to FIG. 11, the information exchanged between a mobile station (designated "MS") and a base station (designated "BS") is illustrated following method B, constructed according to the principles of the invention, wherein the base station determines the mobile station's EGPRS, 8-PSK and LATRED capability at the reception of EGPRS packet channel request. The mobile station makes a packet channel request such as an EGPRS packet channel request on a packet random access channel ("(P)RACH") to a serving base station, signaling one-phase access, including as appropriate the mobile station's EGPRS, 8-PSK and/or LATRED capability (designated 1110). The base station replies to the mobile station with a packet uplink assignment on a packet access grant channel ("(P)AGCH") (designated 1120). The mobile station transfers radio link control/media access control ("RLC/MAC") blocks of data to the base station on a packet data traffic channel ("(P)DTCH") including its temporary logical link indicator ("TLLI") and using RLC/MAC header to signal its EGPRS2 capability (designated 1130). The base station then performs contention resolution, and replies to the mobile station with a packet uplink acknowledge/no acknowledge signal including the contention resolution TLLI on a packet associated control channel ("(P)ACCH") (designated 1140). When the mobile station receives the packet uplink acknowledged/no acknowledge signal including the contention resolution TLLI, the contention resolution at EGPRS one-phase access is completed.

Figure 12:
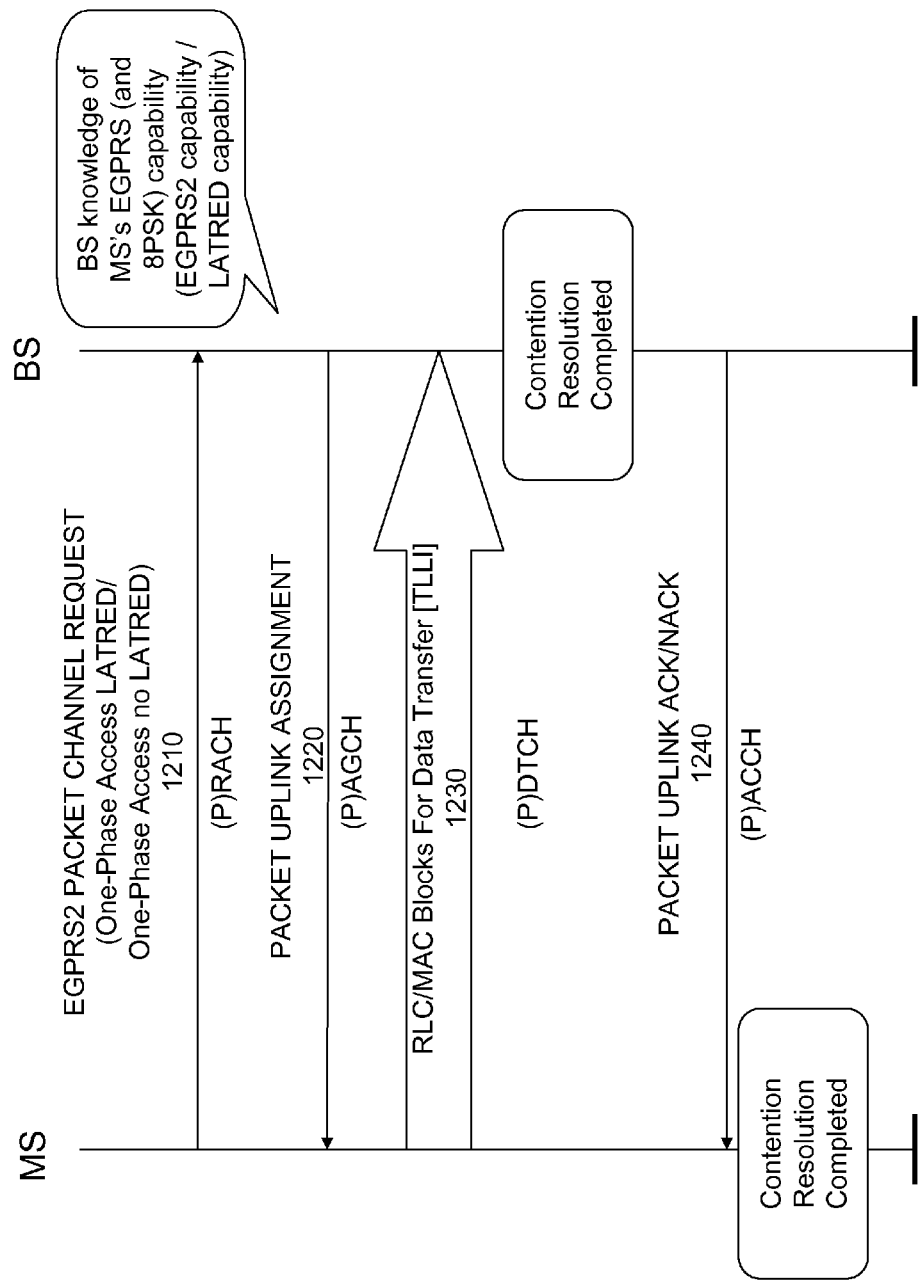

Turning now to FIG. 12, the information exchanged between a mobile station (designated "MS") and a base station (designated "BS") is illustrated following method C, constructed according to the principles of the invention, wherein the base station determines the mobile station's EGPRS, 8-PSK and LATRED capability, and the mobile station's EGPRS2 and/or LATRED capability. The mobile station makes a packet channel request such as an EGPRS2 packet channel request on a packet random access channel ("(P)RACH") to a serving base station, signaling one-phase access, including the mobile station's LATRED capability, and by the message structure, its EGPRS2 capability (designated 1210). The mobile station may also make an EGPRS packet channel request on a packet random access channel to a serving base station, signaling one-phase access, including the mobile station's 8PSK and LATRED capability. The base station replies to the mobile station with a packet uplink assignment on a packet access grant channel ("(P)AGCH") (designated 1220). The mobile station transfers radio link control/media access control ("RLC/MAC") blocks of data to the base station on a packet data traffic channel ("(P)DTCH") including its temporary logical link indicator ("TLLI") (designated 1230). The base station then performs contention resolution, and replies to the mobile station with a packet uplink acknowledge/no acknowledge signal including the contention resolution TLLI on a packet associated control channel ("(P)ACCH") (designated 1240). When the mobile station receives the packet uplink acknowledged/no acknowledge signal including the contention resolution TLLI, the contention resolution at EGPRS one-phase access is completed.

The three methods introduced above solve the problem of signaling support of EGPRS2, LATRED features, or both, in an uplink, with one-phase access. A comparison of the three methods is shown below in Table 15.

TABLE 15

Advantages of Methods A, B, and C

| Method A | Method B | Method C |
|---|---|---|
| One-phase access: capabilities known at random access | | One-phase access: capabilities known at random access |
| Relies on current PRACH encoding of EGPRS PCR for indicating LATRED support for EGPRS and EGPRS2 | Relies on current PRACH encoding of EGPRS PCR for indicating LATRED support for EGPRS and EGPRS2 | Relies on current PRACH encoding of EGPRS PCR for indicating LATRED support for EGPRS |
| No change to RLC/MAC header | | No change to RLC/MAC header |
| | EGPRS supported equally well as EGPRS2 (in terms of LATRED) | EGPRS supported equally well as EGPRS2 (in terms of LATRED) |
| | High level of granularity for multi-slot hyper class indication | High level of granularity for multi-slot hyper class indication |

In addition, program or code segments making up the various embodiments of the present invention may be stored in a computer readable medium or transmitted by a computer data signal embodied in a carrier wave, or a signal modulated by a carrier, over a transmission medium. The "computer readable medium" may include any medium that can store or transfer information. Examples of the computer readable medium include an electronic circuit, a semiconductor memory device, a ROM, a flash memory, an erasable ROM ("EROM"), a floppy diskette, a compact disk CD-ROM, an optical disk, a hard disk, a fiber optic medium, a radio frequency ("RF") link, and the like. The computer data signal may include any signal that can propagate over a transmission medium such as electronic communication network channels, optical fibers, air, electromagnetic links, RF links, and the like. The code segments may be downloaded via computer networks such as the Internet, Intranet, and the like.

As described above, the exemplary embodiment provides both a method and corresponding apparatus consisting of various modules providing functionality for performing the steps of the method. The modules may be implemented as hardware (including an integrated circuit such as an application specific integrated circuit), or may be implemented as software or firmware for execution by a computer processor. In particular, in the case of firmware or software, the exemplary embodiment can be provided as a computer program product including a computer readable storage structure embodying computer program code (i.e., software or firmware) thereon for execution by the computer processor.

Although the present invention and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof. Also, many of the features, functions and steps of operating the same may be reordered, omitted, etc., and still fall within the broad scope of the present invention.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:
1. An apparatus, comprising:
a processor configured to create a packet channel request message enabling one-phase access including an indication of a latency reduction capability of said apparatus; wherein said packet channel request message enabling one-phase access includes indication of enhanced general packet radio service phase 2 (EGPRS2) capability of said apparatus; and
a transceiver configured to transmit said packet channel request message enabling one-phase access to a base station.

2. The apparatus as recited in claim 1 wherein said packet channel request message includes cause values for said one-phase access.

3. The apparatus as recited in claim 2 wherein a field of said cause values is configured to indicate said latency reduction capability.

4. The apparatus as recited in claim 2 wherein said cause values include a multi-slot hyper class field configured to provide a multi-slot class grouping associated with said apparatus.

5. A user equipment comprising:
a processor configured to create a packet channel request message including cause values for one-phase access with an indication of a latency reduction capability of said user equipment, said cause values including a multi-slot hyper class field configured to provide a multi-slot class grouping associated with said user equipment;
wherein said packet channel request message includes indication of enhanced general packet radio service phase 2 (EGPRS2) capability of said user equipment; and
a transceiver configured to transmit said packet channel request message for enabling one-phase access to a base station.

6. A computer program product comprising program code stored in a non-transitory computer readable medium configured to control a processor to perform a process, comprising:
creating a packet channel request message including cause values for one-phase access with an indication of a latency reduction capability of a user equipment,
wherein said packet channel request message includes indication of enhanced general packet radio service phase 2 (EGPRS2) capability of said user equipment; and
transmitting said packet channel request message enabling one-phase access to a base station, wherein said cause values of said packet channel request message include a multi-slot hyper class field configured to provide a multi-slot class grouping associated with said user equipment.

7. A method, comprising:
creating a packet channel request message enabling one-phase access including an indication of a latency reduction capability of a user equipment;
wherein said packet channel request message includes indication of enhanced general packet radio service phase 2 (EGPRS2) capability of said user equipment; and
transmitting said packet channel request message enabling one-phase access to a base station.

8. The method as recited in claim 7 wherein said packet channel request message includes cause values with a field configured to indicate said latency reduction capability and a multi-slot hyper class field configured to provide a multi-slot class grouping associated with said user equipment.

9. An apparatus, comprising:
a transceiver configured to receive a packet channel request message from a user equipment enabling one-phase access including an indication of a latency reduction capability of said user equipment;
wherein said packet channel request message includes indication of enhanced general packet radio service phase 2 (EGPRS2) capability of said user equipment; and
a processor configured to provide a wireless channel to said user equipment to transmit an information message in response to said packet channel request message enabling one-phase access.

10. The apparatus as recited in claim 9 wherein said packet channel request message includes cause values with a field configured to indicate said latency reduction capability and a multi-slot hyper class field configured to provide a multi-slot class grouping associated with said user equipment.

11. A base station, comprising:
a transceiver configured to receive a packet channel request message from a user equipment including cause values for one-phase access with an indication of a latency reduction capability of said user equipment, said cause values including a multi-slot hyper class field configured to provide a multi-slot class grouping associated with said user equipment,
wherein said packet channel request message includes indication of enhanced general packet radio service phase 2 (EGPRS2) capability of said user equipment; and
wherein the base station is configured to provide a wireless channel to said user equipment to transmit an information message in response to said packet channel request message enabling one-phase access.

12. A computer program product comprising program code stored in a non-transitory computer readable medium configured to control a processor to perform a process, comprising:
receiving a packet channel request message from a user equipment including cause values for one-phase access with an indication of a latency reduction capability of said user equipment,
wherein said packet channel request message includes indication of enhanced general packet radio service phase 2 (EGPRS2) capability of said user equipment;
providing a wireless channel to said user equipment to transmit an information message in response to said packet channel request message enabling one-phase access, wherein said cause values of said packet channel request message include a multi-slot hyper class field configured to provide a multi-slot class grouping associated with said user equipment.

13. A method, comprising:
receiving a packet channel request message from a user equipment enabling one-phase access including an indication of a latency reduction capability of said user equipment;
wherein said packet channel request message includes indication of enhanced general packet radio service phase 2 (EGPRS2) capability of said user equipment; and
providing a wireless channel to said user equipment to transmit an information message in response to said packet channel request message enabling one-phase access.

14. The method as recited in claim 13 wherein said packet channel request message includes cause values with a field configured to indicate said latency reduction capability and a multi-slot hyper class field configured to provide a multi-slot class grouping associated with said user equipment.

* * * * *